H. B. LORENTZEN.
ELECTRIC MELTING AND REDUCTION FURNACE.
APPLICATION FILED APR. 20, 1911.
996,492.
Patented June 27, 1911.
3 SHEETS—SHEET 1.
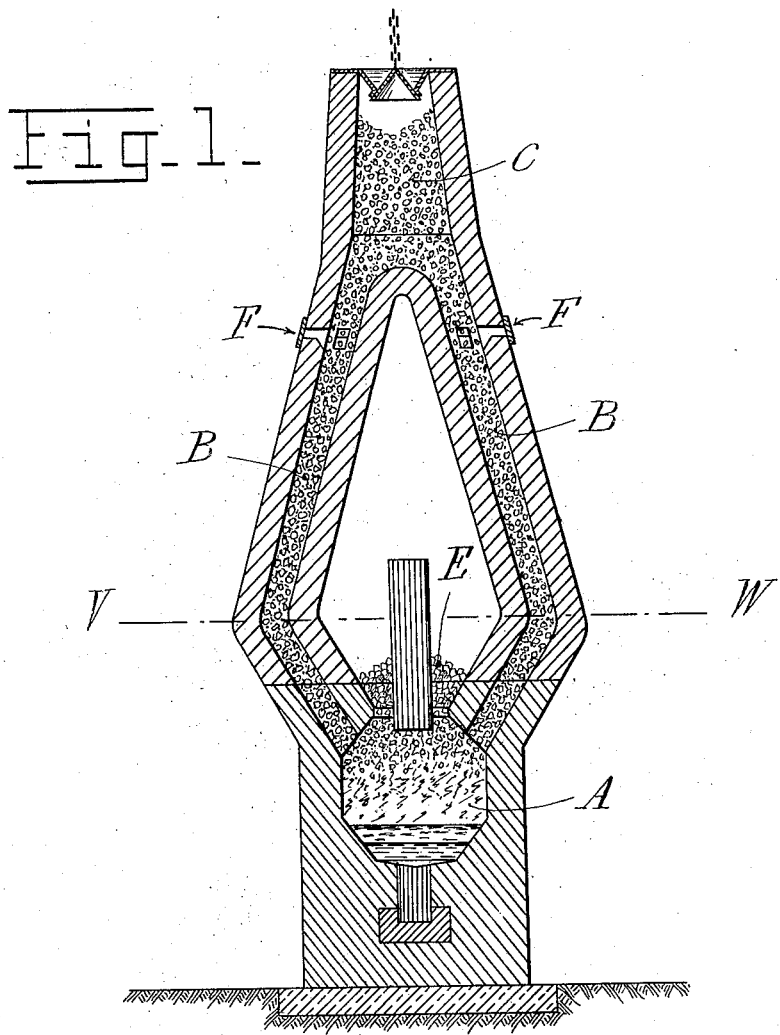
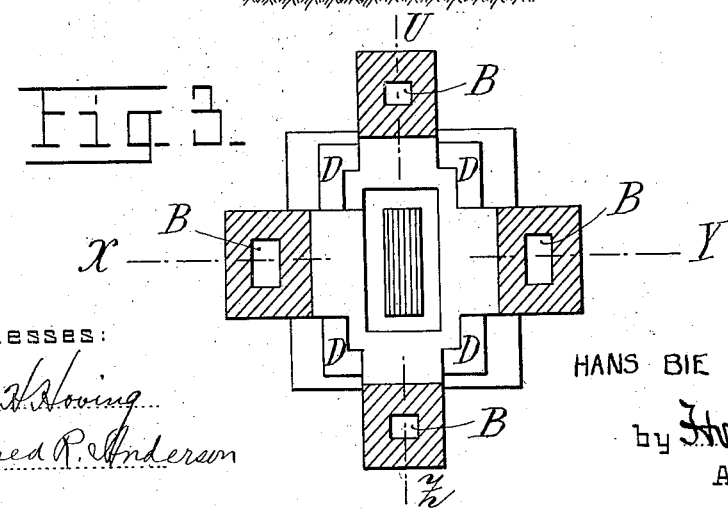
Witnesses:
John H. Hoving
Alfred R. Anderson
Inventor:
HANS BIE LORENTZEN
by T. Van Oldenneel
Attorney H. B. LORENTZEN.
ELECTRIC MELTING AND REDUCTION FURNACE.
APPLICATION FILED APR. 20, 1911.
996,492.
Patented June 27, 1911.
3 SHEETS—SHEET 2.
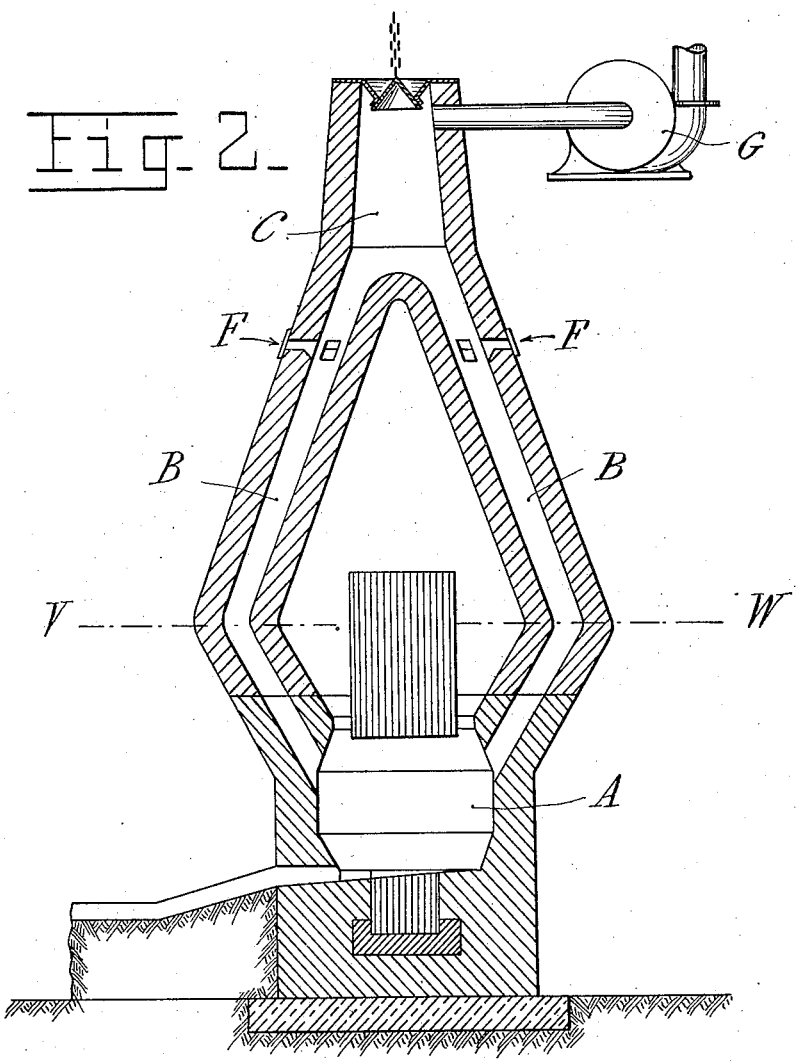
Witnesses:
John H. Hoving
Alfred R. Anderson
Inventor:
HANS BIE LORENTZEN
by H. Van Ildemuel
Attorney

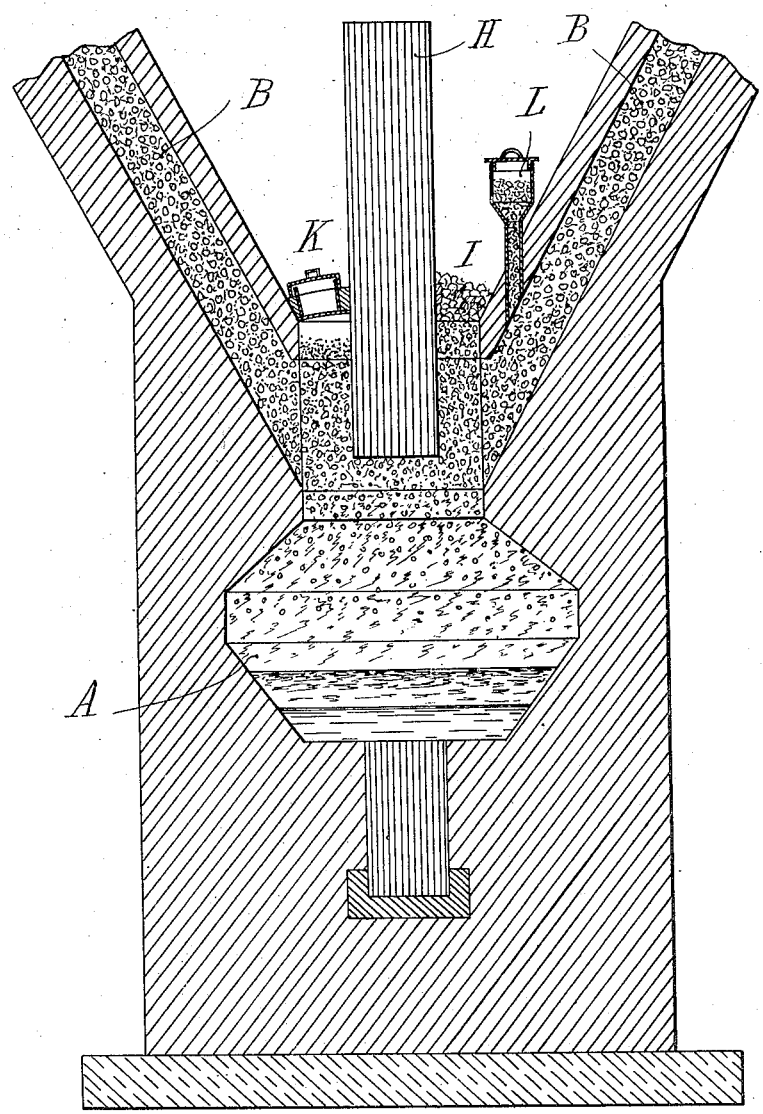

UNITED STATES PATENT OFFICE.

HANS BIE LORENTZEN, OF NOTODDEN, NORWAY.

ELECTRIC MELTING AND REDUCTION FURNACE.

996,492.  Specification of Letters Patent. Patented June 27, 1911.

Application filed April 20, 1911. Serial No. 622,393.

*To all whom it may concern:*

Be it known that I, HANS BIE LORENTZEN, of Notodden, in the Kingdom of Norway, have invented certain new and useful Improvements in Electric Melting and Reduction Furnaces; and I do hereby declare the following to be a full, clear, and exact description of the invention, such as will enable others skilled in the art to which it appertains to make and use the same.

This invention relates to certain new and useful improvements in electrical melting and reducing furnace, and has for its object to provide a furnace of this type which possesses the advantages of an open-furnace, and which further completely utilizes the reducing capability of the fuel.

In the drawings: Figure 1 is a vertical sectional view taken on the line X—Y of Fig. 3, Fig. 2 is a similar view taken on the line U—Z of Fig. 3, Fig. 3 is a horizontal sectional view taken on the line V—W of Figs. 1 and 2, and Fig. 4 is a fragmentary enlarged vertical sectional view of a modified form of the invention.

A designates a crucible furnace provided with the usual electrodes. Surrounding the upper electrode are a series of vertical channels or passages B, which latter preferably terminate in a charging shaft C which is common to all of the passages B, in which the reducing material, carbon, is placed, the same then entering the passages B and gravitates down the latter to surround the upper electrode and enter the furnace A. In order to confine the carbon in the furnace, walls D, may be built to extend up between the passages B. As the melting in the furnace progresses, gases are formed which pass through the mass of carbon designated E, which latter surrounds the upper electrode. In order to controvert the gas action, an air pump or fan G, is arranged at the top of the charging shaft C, whose function it is to draw off the gases through the passages B. Obviously by utilizing the reducing capabilities of the gases, the carbonic acid resulting from the reduction is not converted back into carbonic oxid, due to the action of the ore and carbon when in the presence of each other.

Adjustable valve F, may, if desired, be placed in the passages B to allow of the introduction of air into the latter, which results in burning of the carbonic oxid, and in utilizing the burning value of the gases for preheating of the charge.

By use of the present invention the electrodes may be used up to the holders thereof and being surrounded by carbon are protected against off-burning. Moreover, it is possible to use tools in the furnace.

The drawings show a single-phase furnace, though obviously a plurality of top and bottom electrodes may be used, and the number of passages B varied as desired or found necessary.

In Fig. 4 the channels or passages B, terminate at substantially the base of the top electrode so that the material egressing from the passages B, replaces the material which has preceded same, thus causing the material to enter the furnace at the maximum heat zone of the latter. Fig. 4 shows a covered opening K, which is used in case the furnace is used as a closed furnace.

The arrangement may be utilized not only in furnaces into which the materials are introduced in a mixed condition through the channels, but also in furnaces in which the materials are fed in separately, viz: the ore or the material to be reduced may be fed through the passages and the reducing material, carbon, fed in around the electrode or electrodes, or through a conduit, for instance as indicated at L in the drawings, which latter communicates with passage B. Finally, the arrangement may be used in furnaces operated by single-phase or by poly-phase alternating current and provided with a bottom electrode or without the latter.

What is claimed is:

1. A furnace of the type set forth, including in combination with upper and lower electrodes, a series of spaced independent channels each having a downwardly inclined upper portion and an inwardly inclined lower portion, the latter arranged to surround the upper electrode and having discharge ends disposed adjacent said upper electrode, and a shaft at the upper ends of said channels common to all of the same.

2. A furnace of the type set forth, including in combination with upper and lower electrodes, a series of spaced independent channels arranged to surround the upper electrode and having discharge ends disposed adjacent said upper electrode, and means to feed air into the upper end of each of said channels to effect burning of the carbonic oxid and thereby preheating of the ore.

3. A furnace of the type set forth, including in combination with upper and lower electrodes, a series of spaced independent channels arranged to surround the upper electrode and having discharge ends disposed adjacent said upper electrode, the discharge ends of said channels being spaced from the electrode to permit of the introduction of material in said spaces.

4. A furnace of the type set forth, including in combination with upper and lower electrodes, a series of spaced independent channels arranged to surround the upper electrode and having discharge ends disposed adjacent said upper electrode, and walls arranged in the spaces between said channels to confine the carbon in the furnace.

In testimony whereof I have signed my name to this specification in the presence of two subscribing witnesses.

HANS BIE LORENTZEN.

Witnesses:
HANS GERLING JOHANNESJEN
KATHINKA PAULSURO.